(12) United States Patent
Cartier

(10) Patent No.: US 7,460,124 B2
(45) Date of Patent: Dec. 2, 2008

(54) VECTOR-BASED GEOMETRIC POLYGON SCHEMA

(75) Inventor: Kenn D. Cartier, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 406 days.

(21) Appl. No.: 11/294,168

(22) Filed: Dec. 5, 2005

(65) Prior Publication Data

US 2007/0126739 A1 Jun. 7, 2007

(51) Int. Cl.
  *G06T 11/20* (2006.01)
(52) U.S. Cl. ...................... 345/441; 345/426
(58) Field of Classification Search .................. None
  See application file for complete search history.

(56) References Cited

U.S. PATENT DOCUMENTS

| | | | | |
|---|---|---|---|---|
| 6,166,717 A | * | 12/2000 | Nakayama | 345/611 |
| 6,885,371 B2 | * | 4/2005 | Chang | 345/427 |
| 7,081,895 B2 | * | 7/2006 | Papakipos et al. | 345/506 |
| 2004/0207642 A1 | * | 10/2004 | Crisu et al. | 345/626 |

* cited by examiner

*Primary Examiner*—Kee M Tung
*Assistant Examiner*—Michelle K Lay
(74) *Attorney, Agent, or Firm*—Amin, Turocy & Calvin, LLP

(57) ABSTRACT

A system for configuring orientation and storing criteria corresponding to vector elements that form a boundary of a polygon is provided. This innovation can define the boundary of a polygon as individual vectors with implied "from-" and "to-" directionality and can store the vectors in a standard manner such that they are always aligned in a like orientation. This novel configuration and/or storage mechanism(s) can facilitate efficient spatial operations. Particularly, spatial operations can be enhanced by employing a single formula to compare a reference point to any of the vectors forming the boundary when determining intersection with a boundary vector segment. Additionally, the innovation can employ a novel schema to store vector information into a relational database management system (RDBMS). As such, the data can be used for performing spatial selection operations such as the well-known Point-In-Polygon and Polygon-on-Polygon operations.

20 Claims, 9 Drawing Sheets

VECTOR-BASED GEOMETRIC POLYGON SCHEMA

BACKGROUND

The Internet continues to make available ever-increasing amounts of information which can be stored in databases and accessed therefrom. Additionally, with the proliferation of portable terminals (e.g., notebook computers, cellular telephones, personal data assistants (PDAs), smartphones and other similar communication devices), users are becoming more mobile, and hence, more reliant upon information accessible via the Internet. For example, many users are interested in using the vast information base of the Internet to locate driving directions to a destination address or to locate businesses in close proximity to a pre-selected location.

As polygon geometry storage and query systems (e.g., mapping applications) continue to evolve with respect to the Internet, there is an ongoing demand to locate additional focused and targeted information by users. Conventionally, mapping applications have been used primarily to provide users with directions to and/or from a particular location. As well, conventionally, these applications oftentimes provide additional generic information about the particular destination location.

By way of example, when planning for a vacation, a user can use a mapping application to easily request driving directions from one location to another. Additionally, these mapping applications can be employed to provide other information about a destination location. For example, many applications can assist a user to research a destination location with regard to "must see" locations.

Today, as these mapping applications continue to evolve, uses for the underlying information also continues to evolve. For example, it is not uncommon for a user to search for specific information based upon a reference point. By way of specific example, today, a user can search for specific establishments within a defined radius of a reference point. Similarly, it is sometimes useful for a user to define an area in order to locate a specific group of targeted items that fall within the defined area. For example, one use of this area-based analysis would be directed to a targeted advertising campaign. Another common example would be directed to a political campaign. In either of these scenarios, it is oftentimes desirable to be able to locate a demographic characteristic with respect to an identified region, either arbitrary or defined (e.g., county line, state).

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

Geographic area features, such as the shape of a political unit or shape of a county, can be represented in a digital mapping application as geometric polygons. When stored in a relational database management system (RDBMS), the data can be used for performing spatial selection operations such as the well-known Point-In-Polygon and Polygon-on-Polygon operations using set-based operations.

The innovation disclosed and claimed herein, in one aspect thereof, comprises a design of a database schema that can efficiently store the data and efficiently support the query language for the RDBMS in order to achieve high performance when performing a spatial query. In accordance therewith, line segments which define the boundary of a polygon can be stored in a database as individual vectors with implied "from-" and "to-" directionality.

For example, in one aspect, the novel innovation can store the vectors in a standard manner such that the vectors are always aligned with a bottom-to-top and left-to-right orientation, based at least in part, upon the sloping characteristics of the vectors. Other aspects can employ top-to-bottom and right-to-left orientations for sloping and non-sloping vectors, respectively. It will be understood that storage of the line segments with a pre-defined orientation simplifies spatial computations and therefore can improve performance of Point-in-Polygon and other Polygon-on-Polygon spatial operations.

In an aspect, the innovation can employ a directionality analysis component to determine directionality of each of the vectors that form a boundary of a given polygon. Additionally, an orientation arrangement component can be employed to configure and/or reconfigure the vectors in a standard manner. By way of example, all sloping vectors can be arranged in a like direction (e.g., bottom-to-top, top-to-bottom). Similarly, all non-sloping vectors can be arranged in a like direction (e.g., right-to-left, left-to-right).

In still other aspects, for other spatial operations, it can be useful to align the line segments in a winding direction, such as in a clockwise direction around the ring of the polygon. Therefore, this innovation can also store a Boolean value which indicates whether the actual storage direction is in alignment with the conceptual winding direction or opposed to it. This Boolean value can be included within the novel schema generation of the innovation.

In yet another aspect, and in order to store the criteria into a RDBMS, the innovation can generate a novel schema that facilitates storing the data. By way of example, a schema design for a SQL-based RDBMS table can include a number of descriptive elements. This schema can be utilized for storing the vector-based polygon boundaries based upon a given polygon.

By way of further and more specific example, a schema can include the following fields:

| SCHEMA ELEMENT | PURPOSE |
| --- | --- |
| PolygonID 602 | Uniquely identifies the polygon |
| RingID 604 | Identifies the boundary ring for a given polygon |
| RingSegmentID 606 | Identifies the line segment for a given polygon ring |
| IsFlipped 608 | Indicates whether the orientation of the line segment has been flipped relative to the normal winding direction |
| XCoordinate1 610 | Stores the starting x-coordinate of the ring segment |
| YCoordinate1 612 | Stores the starting y-coordinate of the ring segment |
| XCoordinate2 614 | Stores the ending x-coordinate of the ring segment |
| YCoordinate2 | Stores the ending y-coordinate of the ring segment |
| Slope | Stores the slope of the ring segment |
| YIntercept | Stores the Y-axis intercept of the ring segment |

In another aspect, a rules-based logic component can be employed to facilitate automation and/or decision making mechanisms of the innovation.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
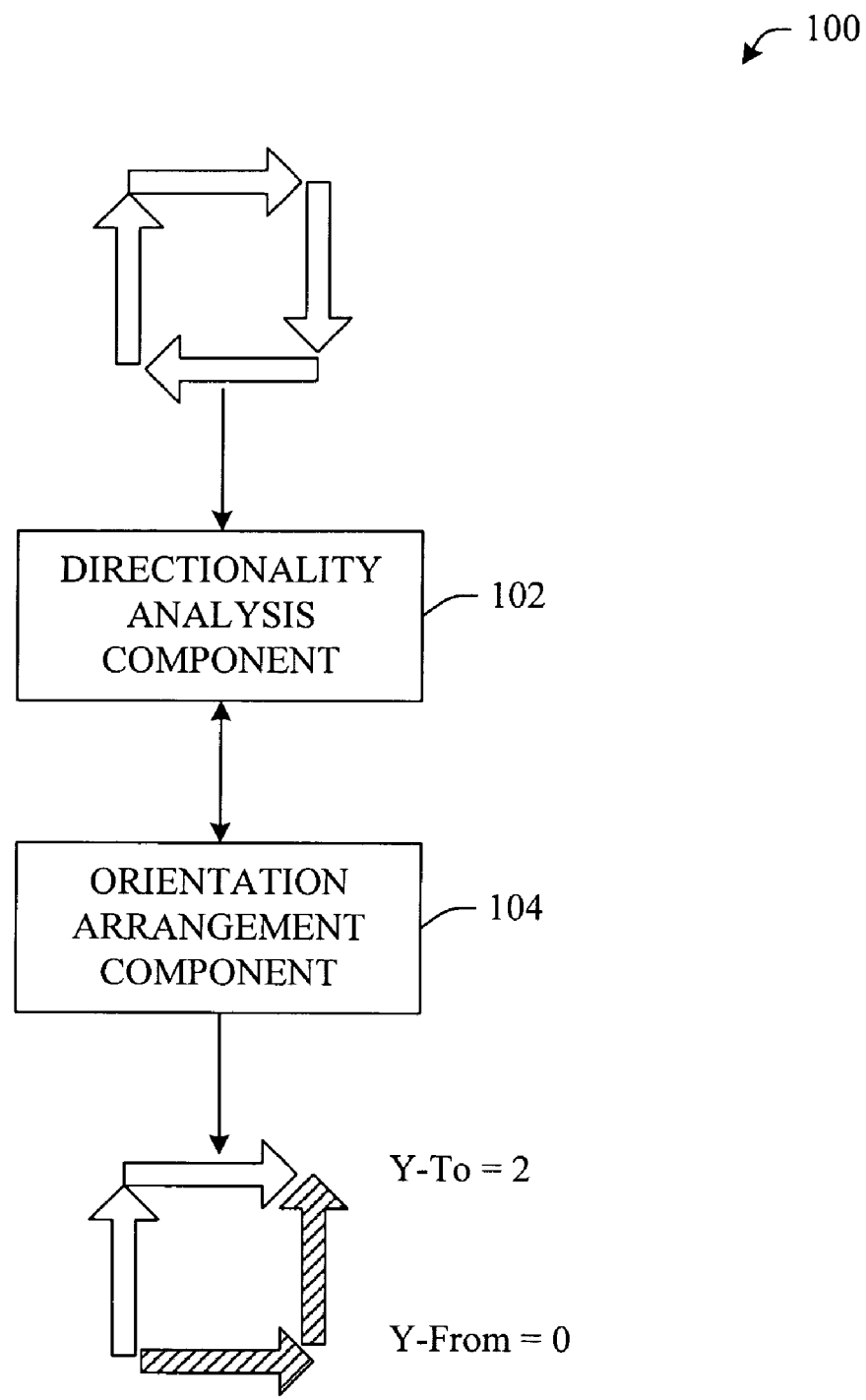
FIG. 1 illustrates block diagram of a system that facilitates configuring vector segments of a polygon in like directions in accordance with an aspect of the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

As used herein, the term to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring initially to the drawings, FIG. 1 illustrates a system 100 that facilitates configuring a vector for efficient spatial operations. Generally, system 100 can include a directionality analysis component 102 and an orientation arrangement component 104. The following scenarios are directed to employing the novel functionality of the invention with reference to a polygon. As such, the boundary of the polygon can be described as a number of vectors arranged in a head-to-tail pattern. It will further be appreciated that the group of vectors can be arranged in a clockwise or counter-clockwise direction following a convention for indicating whether the vector represents the external or inner ring of a polygon.

Oftentimes, with respect to spatial operations, it is particularly useful to determine if a point falls within the length of a vector. For example, in Polygon-on-Polygon and Point-in-Polygon operations this determination is oftentimes necessary in establishing if a given polygon or point falls within, or overlaps, a spatial region (e.g., polygon).

With reference to the Point-in-Polygon operation, a determination is made whether a given point in a plane lies inside, outside, or on the boundary of a polygon. It will be appreciated that this operation, as well as Polygon-on-Polygon is particularly useful in processing geometrical data including, but, not limited to, geographical information systems, computer graphics, motion planning, etc. Accordingly, a ray casting algorithm can be employed to determine if a point lies within the area of a polygon.

It will be appreciated that a ray casting algorithm can be utilized to determine how many times a ray originating from a given point intersects the boundary of a polygon. It will further be understood that, if the ray intersects an even number of times, the point is outside the polygon. On the other hand, if the ray intersects an odd number of times, the point is within the area of the polygon. In order to determine how many segments are intersected, the given point is compared to the head value and the tail value of each vector segment.

In a traditional approach, two comparisons were necessary for each vector in order to confirm a point within a vector. In other words, in a conventional clockwise or counter clockwise vector arrangement, a point, Y0, would have to be compared to a head value and to a tail value twice in order to confirm placement of Y0 with respect to the vector. More particularly, consider a 4 vector polygon arranged in a simple square clockwise pattern.

In the exemplary format, the vectors are arranged, bottom-to-top, left-to-right, top-to-bottom and right-to-left starting with the left side vertical vector. Because of the change in direction between vertical and horizontal vectors, it will be appreciated that a single formula can not be employed to determine if a point, Y0, lies within the vector. For illustrations purposes, the following is a discussion of a ray trace algorithmic determination with respect to point Y0 and the right side vertical vector.

More particularly, in this example, the right side vector in this example points in a top-to-bottom direction. As such, suppose the Y-From (e.g., tail) of the vector is positioned at a value of 2. Similarly, suppose the Y-To (e.g., head) of the vector is positioned at 0. It will be understood that, because the direction of the vector is unknown, conventionally, two individual formulas must be used in order to determine if a point falls within the length of a vector. In other words, two individual formulas would have to be employed to determine if a vector is intersected in a ray trace operation.

Continuing with the example, a first formula, Y0>Y-From AND Y0<Y-To, is employed. In this example, this formula would yield 1>2 AND 1<0, which is obviously false if Y0 were positioned at a value of 1. In order to confirm placement, a second formula, Y0<Y-From AND Y0>Y-To, can be employed. More particularly, this second formula would yield 1<2 AND 1>0, which is true. Thus, intersection can be confirmed.

Referring again to FIG. 1, the clockwise arrangement of the preceding example can be input into the directionality analysis component 102. Accordingly, the directionality analysis component 102 can determine a direction or orientation of each vector that forms a polygon. Although the example illustrated in FIG. 1, as well as the figures that follow, is directed to a simple square, it is to be understood that the novel functionality described herein can be directed to any size or shape polygon without departing from the spirit and scope of this disclosure and/or claims appended hereto. Additionally, it is be appreciated that the novel functionality described herein can be similarly applied to 3-dimensional shapes without departing from the spirit and/or scope of this disclosure and claims appended hereto.

Once an orientation of each vector is determined via the directionality analysis component 102, the orientation arrangement component 104 can be employed to reconfigure vectors thereby arranging vectors in a like direction. In one aspect, all vectors with zero slope (e.g., horizontal vectors) can be arranged in a left to right direction as shown. Similarly, all vectors with a non-zero slope can be arranged in a bottom-to-top direction.

Referring again to the example and to the right side vertical vector, this vector can now be arranged in a bottom-to-top direction. In other words, Y-From is equal to 0 and Y-To is equal to 2. As such, a single formula, Y0>Y-From AND Y0<Y-To, can be utilized to determine in a ray trace from the given point, Y0, will intersect. In this example, this formula would yield, 1>0 AND 1<2, which is true. Therefore, the determination can be made that Y0 falls within the length of the vector. Because the left side vertical vector is arranged in a like direction, it will be appreciated that the same formula can be employed when analyzing intersection with this vector as well.

Although this example illustrates non-sloping vectors in a left-to-right arrangement and all sloping vectors in a bottom-to-top direction, it is to be appreciated that other orientations can be employed when a vector is flipped so long as all non-sloping vectors have a like orientation. As well, all sloping vectors will also have a like orientation. As shown, this reconfiguration of vectors can be employed via the orientation arrangement component 104 once the directionality analysis component 102 determines a particular direction of each segment.

It will be understood that these spatial operations can be particularly useful in mapping and geographic applications. Accordingly, a user can define and render a region (e.g., polygon) on a map and then use this region to find relations to other polygons, point data sources, addresses, and specific geographic locations. Common uses of polygons include defining neighborhoods, political districts, sales regions, delivery areas, cell phone coverage, territories, etc. It is to be appreciated the polygon can be identified via a tool or coordinate system.

Figure 2:
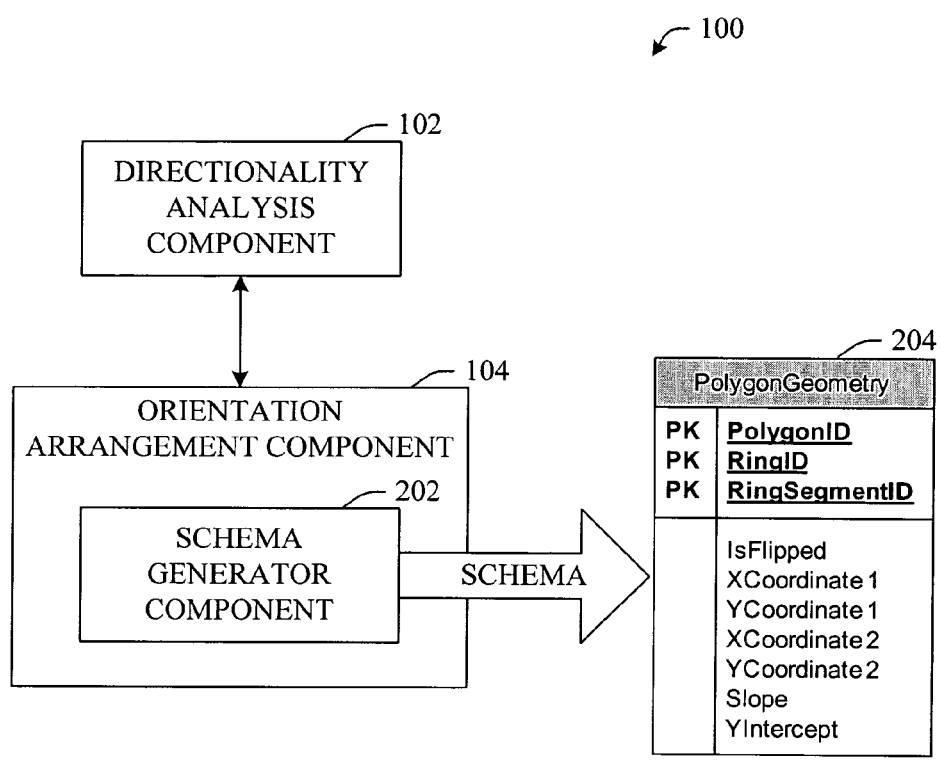
FIG. 2 illustrates a schematic diagram of a system that includes a schema generator component in accordance with an aspect of the novel innovation.

Referring now to FIG. 2, an alternative diagram of system 100 is shown. More particularly, orientation arrangement component 104 can include a schema generator component 202. This schema generator component 202 can be employed to generate a schema 204 that facilitates representation of the characteristics of each like-configuration of each vector. This representation can be stored in the form of the predefined schema 204. Specifically, this schema 204 can facilitate storage of vector criteria in a data store or relational database management system (RDBMS). Accordingly, when performing spatial operations, this information can be obtained and compared to a given point (e.g., Y0) thus facilitates a single operation comparison as described supra. It is to be understood an appreciated that the schema 204 shown in FIG. 2 is one aspect of the novel functionality. Other schema configurations can exist and are to be included within the scope of this disclosure and claims appended hereto.

As discussed above, any geographic area feature, such as the shape of a sales territory, can be represented in a digital mapping application as a geometric polygon. When stored in a RDBMS, the data can be used for performing spatial selection operations such as the well-known Point-In-Polygon (and Polygon-on-Polygon) operation using set-based operations. The design of the database schema 204 can facilitate storage of the data and efficiently support the query language for the RDBMS in order to achieve high performance when performing a spatial query. Accordingly, the schema generator component 202 can facilitate generation of such a schema (e.g., 204). The details of this exemplary schema 204 will be described in greater detail infra.

One novel feature of this subject innovation is the definition of the boundary of a polygon as individual vectors with implied "from-" and "to-" directionality. Another novel feature is the storage of the vectors in a standard manner such that they are always aligned with a like (e.g., bottom-to-top and left-to-right) orientation. As described with reference to FIG. 1, this orientation conversion can be effectuated via the orientation arrangement component 104.

It is to be understood that storage of the line segments (e.g., vectors) with a pre-defined orientation can particularly simplify spatial computations and therefore improve performance of Point-in-Polygon and other Polygon-on-Polygon spatial operations. This subject novel innovation can also store a Boolean value which indicates whether the actual storage direction is in alignment with the conceptual winding direction (e.g., clockwise/counter-clockwise) or opposed to it. This value can be utilized for those situations in which it is useful to align the line segments in a winding direction, such as in a clockwise direction around the ring of the polygon.

Figure 3:
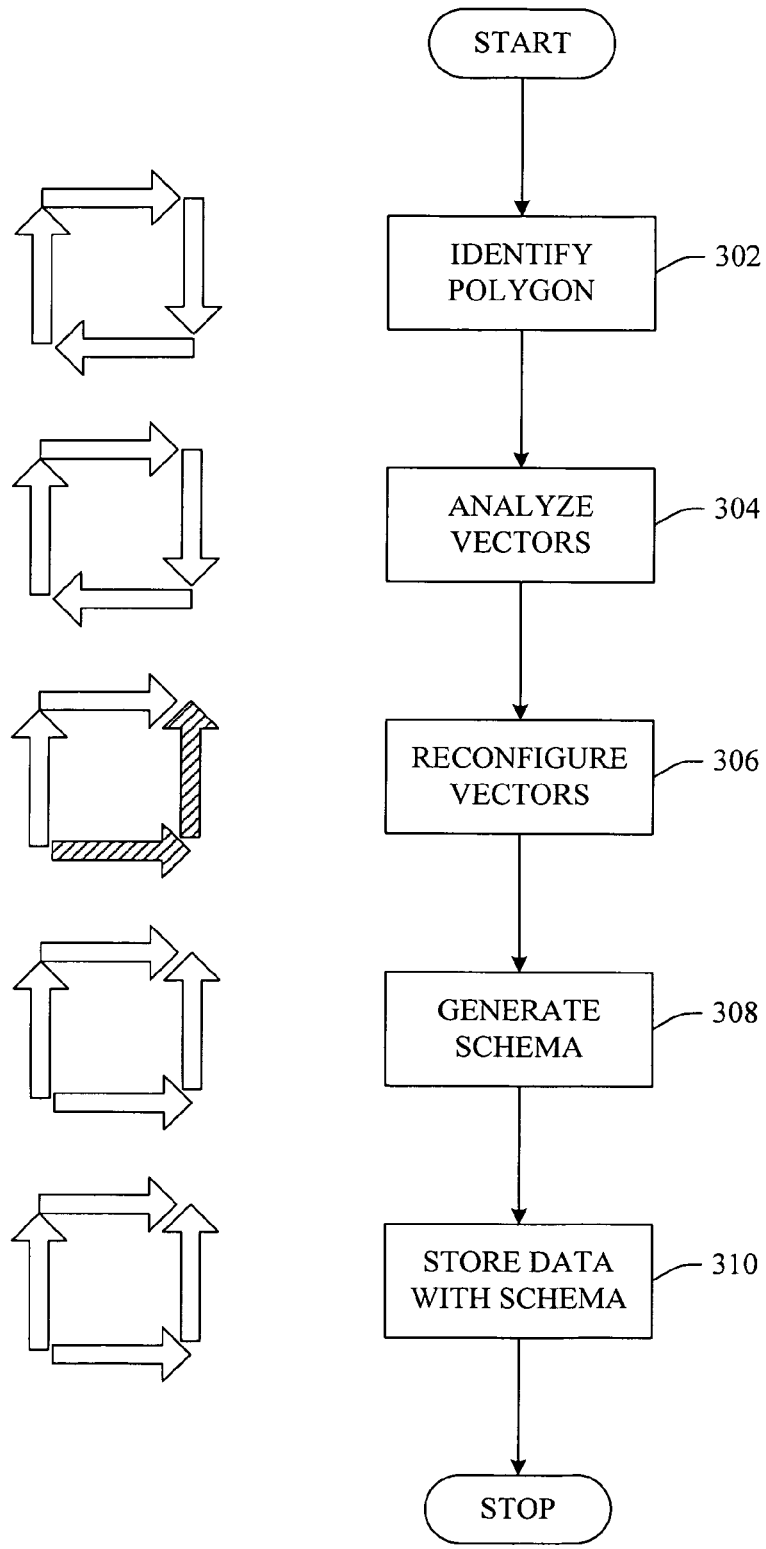
FIG. 3 illustrates an exemplary flow chart of procedures that facilitate reconfiguring vector segments and generating a schema in accordance with an aspect of the innovation.

FIG. 3 illustrates a methodology of configuring vectors and facilitating efficient spatial operations in accordance with an aspect of the innovation. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

At 302 a polygon is identified in order to determine vector segments which can be considered in a spatial operation. For example, the polygon can be identified via a tool, coordinates, application, artificial intelligence inference, etc. As shown in FIG. 3, a simple square polygon will be used for this example.

Once the polygon is identified, each of the vectors or segments is analyzed at 304. In particular, the directionality of each of the vectors can be analyzed in order to determine a direction and/or slope of each individual segment. As described above, the vectors are analyzed in order to determine a like directionality with respect to each of the vectors. For example, all zero-slope vectors can be analyzed to determine which of the vectors do not match a predetermined configuration (e.g., left-to-right, right-to-left). As well, all sloping vectors can be analyzed to determine which of the vectors do not match a predetermined configuration (e.g., bottom-to-top, top-to-bottom).

In another aspect a determination can be made as to a predetermined configuration. For example, in one aspect, a configuration of sloping vectors can be based upon the configuration of a simple majority of the existing vectors. In other words, if following an analysis of the vectors, a majority of the vectors are arranged in a top-to-bottom orientation, the system can employ logic and/or artificial intelligence techniques to determine the orientation for reconfiguration of nonconforming vectors at 306.

At 306, the vectors can be reconfigured to conform to a determined and/or predetermined orientation. As shown in the graphical representation of FIG. 3, vectors can be reconfigured (e.g., flipped) to facilitate spatial operations. Referring to the example shown in FIG. 3, the vectors identified with the hash marks have been reconfigured or flipped. As such, all non-sloping (e.g., horizontal) vectors have a left-to-right orientation. Moreover, all sloping vectors have a bottom-to-top orientation.

For example, the following is exemplary code that can flip or reconfigure the vectors:

```
/* Transfer data into PolygonGeometry table */
-- This SELECT statement assures that the second
(lat,long)
    -- pair is the most northerly of the two.
    -- For south-pointing line segments, reverse the
endpoints
    -- (and the 1/slope and y-intercept calculations) and
    -- set the "IsFlipped" bit.
    -- For east-west line segments (0 slope), assure that
they
    -- are oriented towards east.
    INSERT PolygonGeometry
      (PolygonID, RingID, RingSegmentID
      ,IsFlipped, Lat1, Long1, Lat2, Long2
      ,InverseSlope,YIntercept)
    SELECT PolygonID    = iq.PolygonID
        ,RingID         = iq.RingID
        ,RingSegmentID  = iq.RingSegmentID
        ,IsFlipped      =
          CASE
            WHEN iq.Type in (1,3,5) THEN 0
            ELSE 1
          END
        ,Lat1 =
          CASE
            WHEN iq.Type in (1,3,5) THEN iq.Lat1
            ELSE iq.Lat2
          END
        ,Long1 =
          CASE
            WHEN iq.Type in (1,3,5) THEN iq.Long1
            ELSE iq.Long2
          END
        ,Lat2 =
          CASE
            WHEN iq.Type in (1,3,5) THEN iq.Lat2
            ELSE iq.Lat1
          END
        ,Long2 =
          CASE
            WHEN iq.Type in (1,3,5) THEN iq.Long2
            ELSE iq.Long1
          END
        ,InverseSlope =
          CASE
            WHEN iq.Type = 1
              THEN ((iq.Long2 - iq.Long1)
                 / (iq.Lat2 - iq.Lat1))
            WHEN iq.Type = 2
              THEN ((iq.Long1 - iq.Long2)
                 / (iq.Lat1 - iq.Lat2))
            WHEN iq.Type in (3,4) THEN NULL
            ELSE 0
          END
        ,YIntercept =
          CASE
            WHEN iq.Type = 1
              THEN iq.Lat1 -
                (((iq.Lat2 - iq.Lat1)
                 /(iq.Long2 - iq.Long1)) *
iq.Long1)
            WHEN iq.Type = 2
              THEN iq.Lat2 -
                (((iq.Lat1 - iq.Lat2)
                 /(iq.Long1 - iq.Long2)) *
iq.Long2)
            WHEN iq.Type = 3 THEN iq.Lat1
            WHEN iq.Type = 4 THEN iq.Lat2
            ELSE NULL
          END
    FROM (
      SELECT
        PolygonID       = PolygonID
        ,RingID         = RingID
        ,RingSegmentID  = RingSegmentID
        ,Lat1           = Lat1
        ,Long1          = Long1
        ,Lat2           = Lat2
        ,Long2          = Long2
        ,Type =
          CASE
            -- NE/NW pointing segments
            WHEN Long1 < > Long2 AND Lat1 < Lat2
              THEN 1
            -- SE/SW pointing segments (flip to
NE)
            WHEN Long1 < > Long2 AND Lat1 > Lat2
              THEN 2
            -- East pointing segments
            WHEN Long1 < Long2 AND Lat1 = Lat2
              THEN 3
            -- West pointing segments
            WHEN Long1 > Long2 AND Lat1 = Lat2
              THEN 4
            -- North pointing segments
            WHEN Long1 = Long2 AND Lat1 < Lat2
              THEN 5
            -- South pointing segments
            WHEN Long1 = Long2 AND Lat1 > Lat2
              THEN 6
          END
      FROM     PolygonGeometrySource) iq
```

A schema that represented the reconfigured vectors can be generated at 308. In an alternate aspect, the schema can be generated prior to reconfiguration. At 310 the schema can be employed to store the vector data in a RDBMS.

Figure 4:
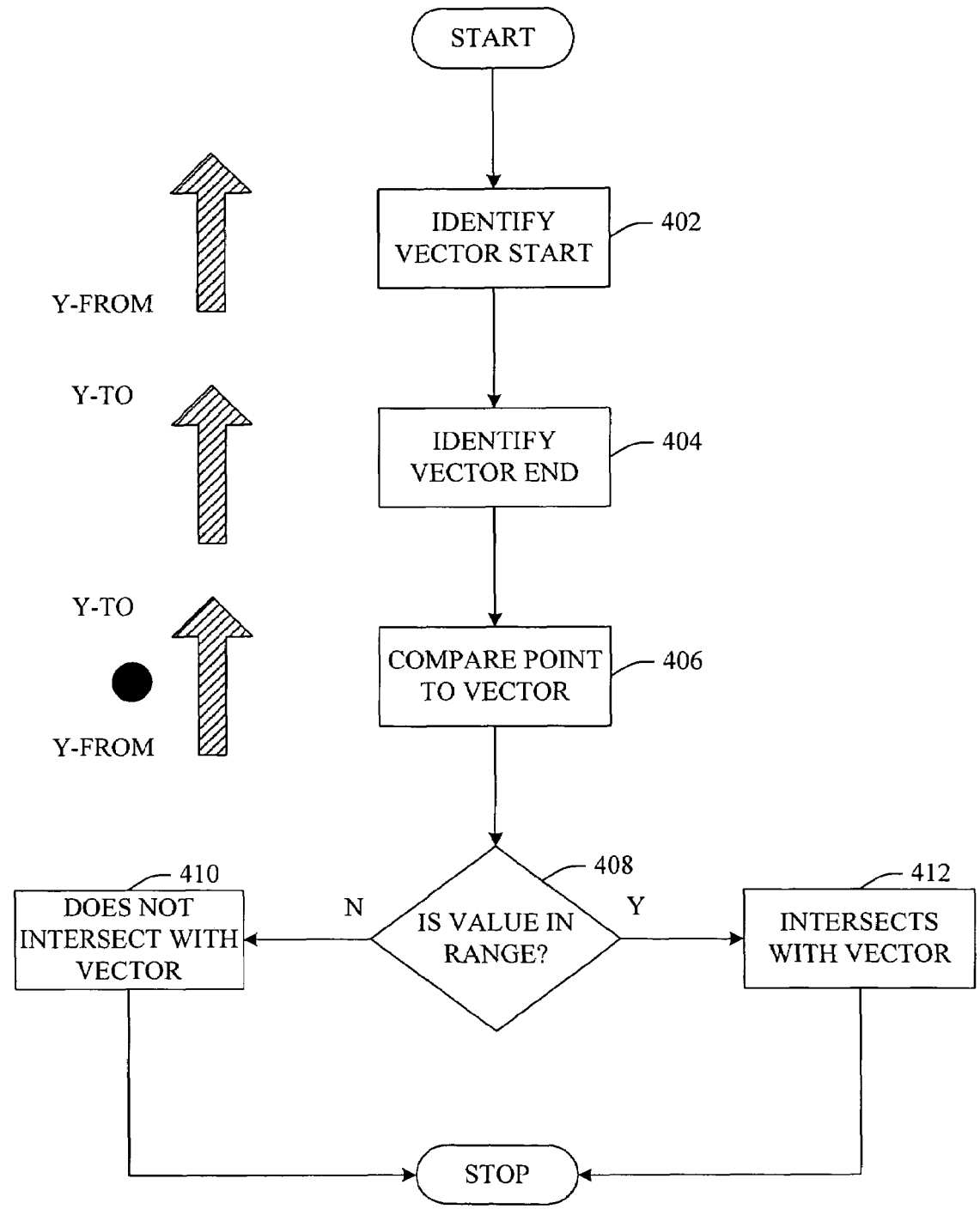
FIG. 4 illustrates an exemplary flow chart of procedures that facilitate comparing a point to a vector using a single formula in accordance with an aspect of the innovation.

FIG. 4 illustrates a methodology of determining if a given point lies within the length of a vector in accordance with an aspect of the innovation. As described with reference to FIG. 3, a vector starting point can be determined. As shown at 402, Y-From can be determined. It will be appreciated that the vector shown in FIG. 4 has been reconfigured to correspond to a preferred and/or predetermined orientation (e.g., bottom-to-top).

At 404, the vector end (e.g., Y-To) can be identified. It will be understood that the novel schema can be employed to store the vector information into a RDBMS. Accordingly, this information can be utilized to compare a reference point to the vector at 406. As described above, this comparison yields results that can be employed by a ray trace algorithm thus facilitating determination if a point lies within a polygon.

At 408, a determination is made if the given point (e.g., Y0 of the example herein) lies within the length of a particular vector. As described supra, it is a novel feature of the innovation to facilitate this determination based upon an output of a single comparison formula. In other words, in accordance with the novel reconfiguration and standard orientation features of the systems described herein, the subject innovation can employ a single formula to determine intersection in accordance with a ray trace algorithm.

Therefore, this determination can assist in spatial operations, e.g., Point-in-Polygon and/or a Polygon-on-Polygon. If at 408, the value of the given point does not fall within a range, a determination is made that a ray from the point does not intersect with the vector. If the value is within the range at 408, a determination is made that a ray from the given point does intersect with the vector at 412.

Following is exemplary code with can utilize the flipped vectors for the Point-in-Polygon operation:

```
-- Find polygon with odd number of line crossings.
SELECT    PolygonID
FROM      PolygonGeometry
-- Thin to vectors which straddle the specified point.
-- It is not necessary to check the opposite
orientation
-- since vectors are always oriented south to north.
WHERE     ((Lat1 <= @pSpecifiedPointLat)
AND          (@pSpecifiedPointLat < Lat2))
-- Then, determine the x intercept along the Ring and
-- compare to the x coordinate of the specified point.
and       @pSpecifiedPointLong <
   CASE
      -- 0-degree line segment
      WHEN InverseSlope IS NULL
         THEN NULL
      -- 90-degree line segment
      WHEN YIntercept IS NULL
         THEN Long2
      ELSE
         (InverseSlope*(@pSpecifiedPointLat–Lat1)
)
         + Long1
   END
-- Finally, thin to polygons with odd number of line
-- intersections.
GROUP BY PolygonID HAVING (COUNT(*) % 2) = 1
```

Figure 5:
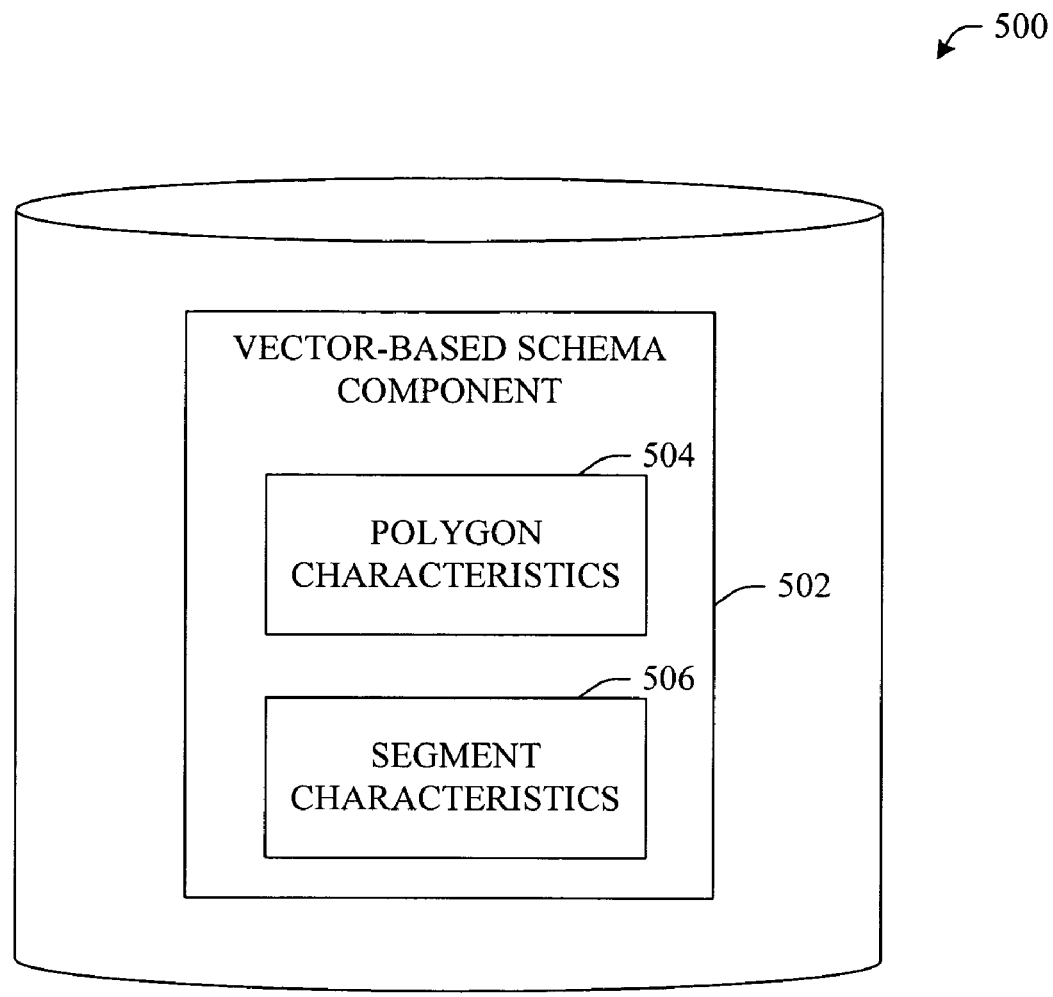
FIG. 5 illustrates an exemplary relational database management system having a vector-based schema component therein in accordance with an aspect of the innovation.

Turning now to FIG. 5, a block diagram of a RDBMS system 500 is shown in accordance with an aspect of the innovation. Generally, the RDBMS system 500 can include a vector-based schema component 502 that facilitates storing information in a standard manner. As described in greater detail above, this standard manner assists a user and/or system in efficient spatial operations. More particularly, in doing so, the schema can include a polygon characteristic component 504 and a segment characteristic component 506. Each of these components, polygon characteristic component 504 and segment characteristic component 506, will be described in greater detail with reference to FIG. 6 that follows.

Figure 6:
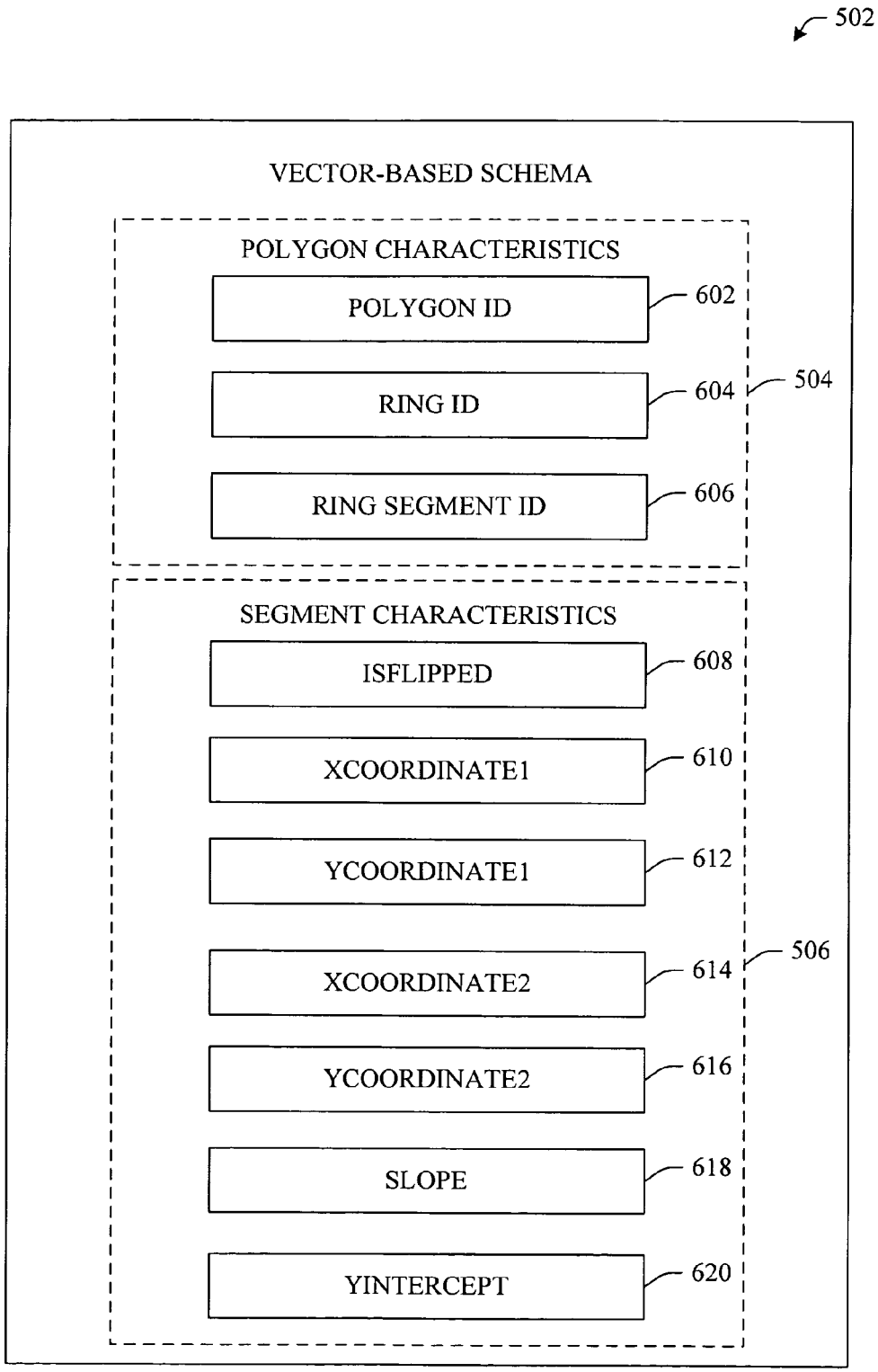
FIG. 6 illustrates exemplary elements of a schema component in accordance with an aspect of the novel subject matter.

FIG. 6 illustrates a specific schema component 502 in accordance with an aspect of the innovation. While the specific schema illustrated in FIG. 6 illustrates particular components, it is to be appreciated that other schema components can be employed which include a subset of the components illustrated in FIG. 6 as well as additional and/or different components than those illustrated. These additional schemas are to be included within the scope of this disclosure and claims appended hereto. In other words, these schemas can facilitate the novel spatial operations described herein.

As described above, geographic area features, such as the shape of a political unit, can be represented in a digital mapping application as geometric polygons. When stored in a RDBMS, the data can be used for performing spatial selection operations such as the well-known Point-in-Polygon and Polygon-on-Polygon operations using set-based operations. In accordance therewith, the design of the database schema 502 can facilitate efficient storage of the data. As well the schema 502 can efficiently support a query language for the RDBMS in order to achieve high performance when performing a spatial query. Although the aspects described herein are directed to RDBMS applications, it is to be understood that the novel features of the innovation can be employed to assist in storage of data in any data management system known in the art.

The schema 502 shown in FIGS. 5 and 6 can facilitate a group of line segments which define the boundary of a polygon to be stored in a database as individual vectors with implied "from-" and "to-" directionality. In accordance with the novel features of the innovation, that schema 502 facilitates storing data that corresponds to the vectors in a standard manner such that the vectors are always aligned in a like orientation (e.g., with a bottom-to-top and left-to-right orientation) based at least in part upon a slope characteristic of each vector.

It is to be appreciated that storage of the line segments with a pre-defined orientation can simplify spatial computations and therefore can improve performance of Point-in-Polygon and other Polygon-on-Polygon spatial operations. For other spatial operations, it can be useful to align the line segments in a winding direction, such as in a clockwise direction around the ring of the polygon. Therefore, this innovation, via schema 502, can also store a Boolean value which indicates whether the actual storage direction is in alignment with the conceptual winding direction or opposed to it.

In accordance with an aspect of the innovation, boundaries for geometric polygons are stored in a vector-based format in a consistent standard manner at least based upon the slope of each vector. Unlike conventional applications and as described in detail above, the coordinates for the line segments which define the boundary of the polygon can be stored with a standard orientation relative to the coordinate system and not relative to the polygon. The schema 502 can facilitate the storage of this information.

In one aspect, all line segments except those with zero slopes are stored having a bottom-to-top orientation. Similarly, in an aspect, line segments with zero slopes are stored with a left-to-right orientation. This standard orientation enables a determination to be made utilizing a single formula rather than multiple computations required by conventional systems. This single formula can greatly enhance efficiency and optimize cost with respect to spatial operations.

It will be appreciated that, conventionally, line segments are stored with a pre-defined winding orientation. For example, the line segments which define the outer ring of a polygon may be stored with a clockwise orientation, whereas inner rings may be stored with a counter-clockwise orientation.

Referring again to FIG. 6, a schema design for a SQL-based RDBMS table for storing the vector-based polygon boundaries in accordance with an aspect of the innovation is shown. The following table includes a brief description of each of the representative components illustrated in accordance with schema 502.

| SCHEMA ELEMENT | PURPOSE |
| --- | --- |
| PolygonID 602 | Uniquely identifies the polygon |
| RingID 604 | Identifies the boundary ring for a given polygon |
| RingSegmentID 606 | Identifies the line segment for a given polygon ring |
| IsFlipped 608 | Indicates whether the orientation of the line segment has been flipped relative to the normal winding direction |
| XCoordinate1 610 | Stores the starting x-coordinate of the ring segment |
| YCoordinate1 612 | Stores the starting y-coordinate of the ring segment |
| XCoordinate2 614 | Stores the ending x-coordinate of the ring segment |
| YCoordinate2 616 | Stores the ending y-coordinate of the ring segment |
| Slope 618 | Stores the slope of the ring segment |
| YIntercept 620 | Stores the Y-axis intercept of the ring segment |

Figure 7:
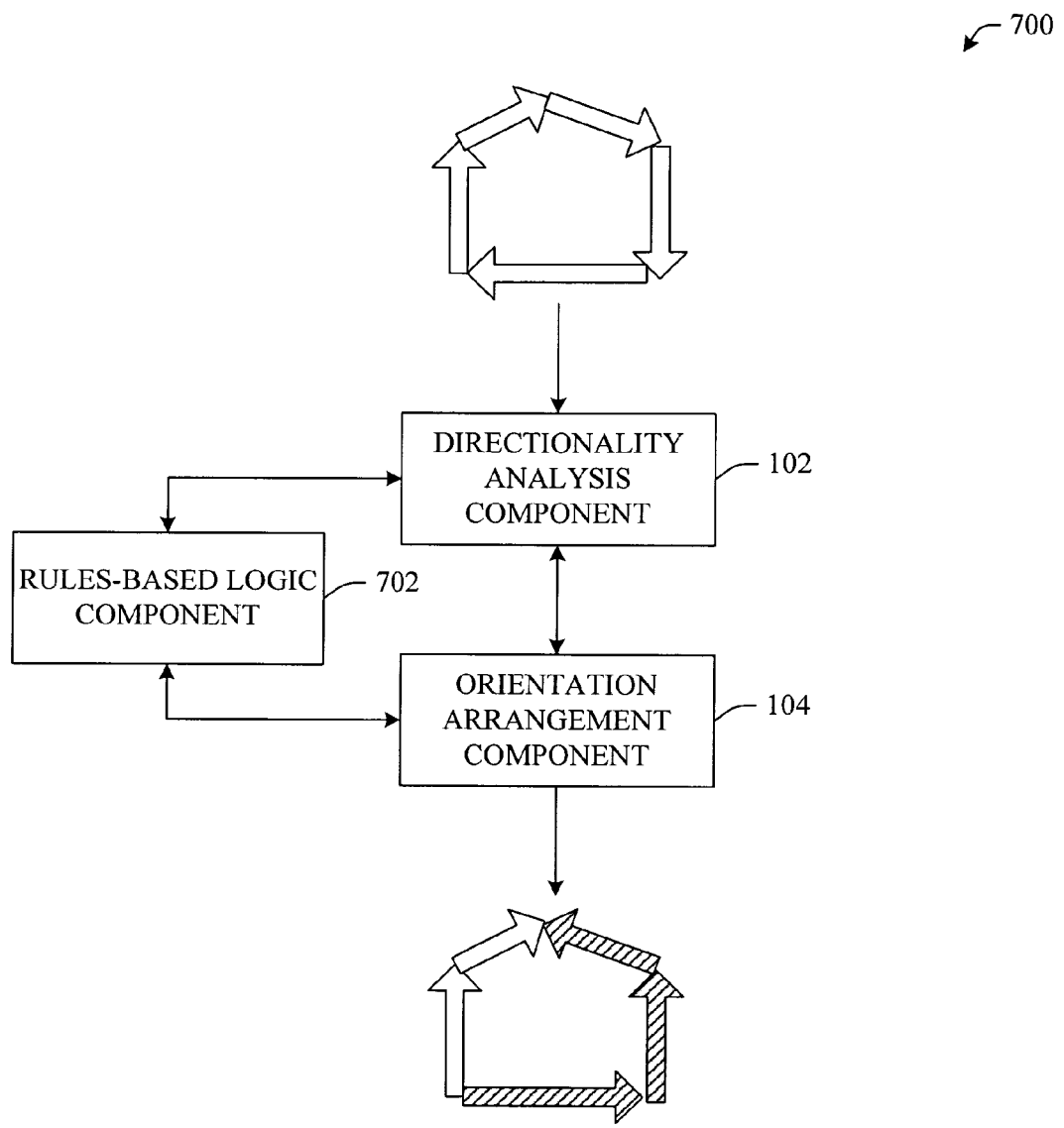
FIG. 7 illustrates an exemplary architecture including a rules-based logic component that facilitates automation in accordance with a user preference and/or determined criterion.

With reference now to FIG. 7, an alternate aspect of an alternative system 700 that facilitates spatial operations is shown. More particularly, system 700 includes a rule-based logic component 702 that predefines a criterion in accordance with an aspect. In accordance with this alternate aspect, an implementation scheme (e.g., rule) can be applied to analyze and/or rearrange a vector or group of vectors of a polygon. In response thereto, the rule-based implementation can select and/or reorient vector component(s) included within the polygon by employing a predefined and/or programmed rule(s) based upon any desired criteria (e.g., position, vector, reference point location, directionality).

By way of further example, the system can automatically decide, based upon a predefined criterion, when/if to flip non-sloping vectors into a right-to-left orientation or a left-to-right orientation. Similarly, a decision can be made when/if to flip a sloping vector into a top-to-bottom orientation or a bottom-to-top orientation. In one aspect, this logic can be based at least in part upon the original configuration of a majority of the vectors. In other words, the system can determine the least number of vectors to flip in order to achieve a like direction for all non-sloping and sloping vectors respectively.

Figure 8:
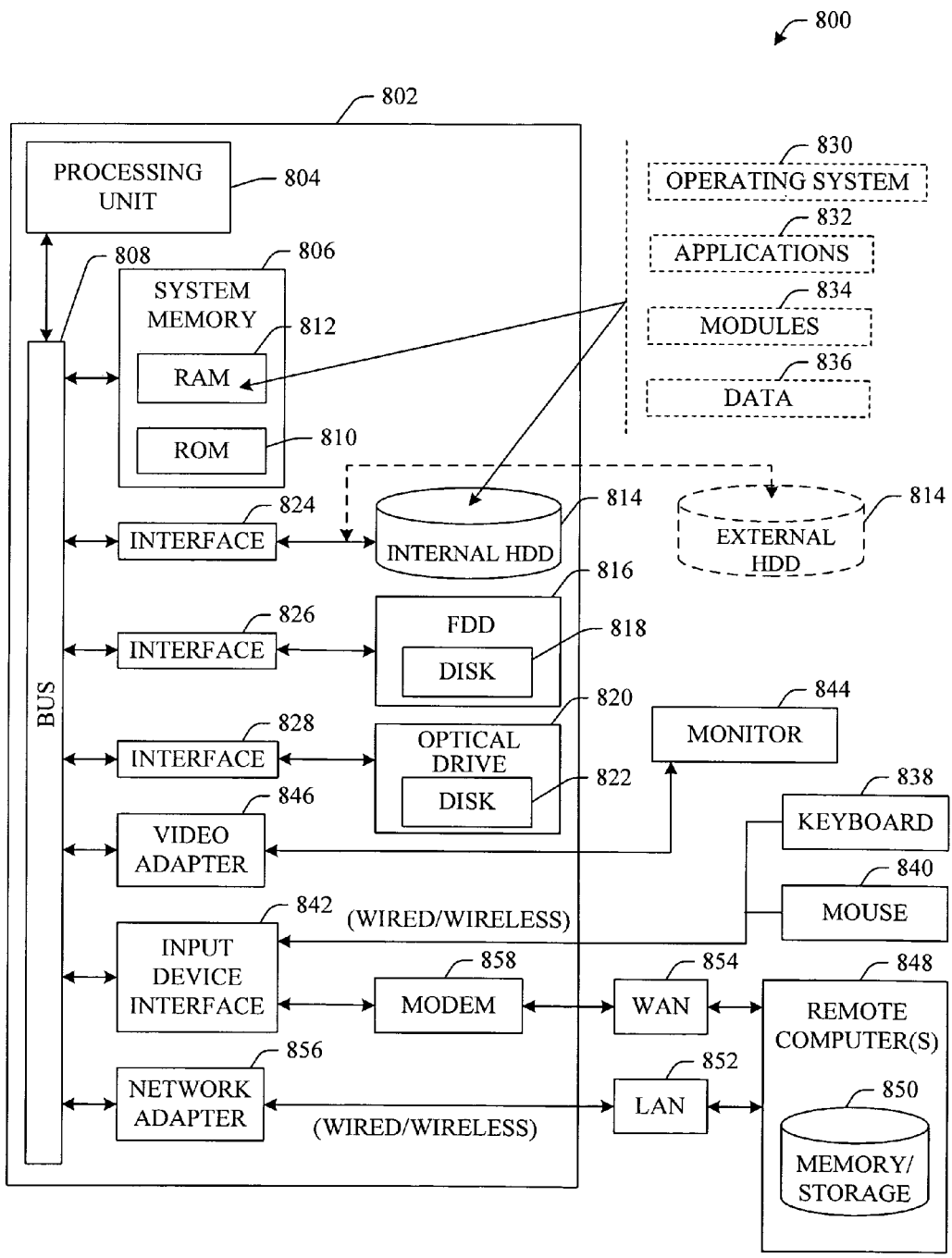
FIG. 8 illustrates a block diagram of a computer operable to execute the disclosed architecture.

Referring now to FIG. 8, there is illustrated a block diagram of a computer operable to execute the disclosed architecture of facilitating spatial operations. In order to provide additional context for various aspects of the subject innovation, FIG. 8 and the following discussion are intended to provide a brief, general description of a suitable computing environment 800 in which the various aspects of the innovation can be implemented. While the innovation has been described above in the general context of computer-executable instructions that may run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 8, the exemplary environment 800 for implementing various aspects of the innovation includes a computer 802, the computer 802 including a processing unit 804, a system memory 806 and a system bus 808. The system bus 808 couples system components including, but not limited to, the system memory 806 to the processing unit 804. The processing unit 804 can be any of various commercially available processors. Dual microprocessors and other multi-processor architectures may also be employed as the processing unit 804.

The system bus 808 can be any of several types of bus structure that may further interconnect to a memory bus (with or without a memory controller), a peripheral bus, and a local bus using any of a variety of commercially available bus architectures. The system memory 806 includes read-only memory (ROM) 810 and random access memory (RAM) 812. A basic input/output system (BIOS) is stored in a nonvolatile memory 810 such as ROM, EPROM, EEPROM, which BIOS contains the basic routines that help to transfer information between elements within the computer 802, such as during start-up. The RAM 812 can also include a high-speed RAM such as static RAM for caching data.

The computer 802 further includes an internal hard disk drive (HDD) 814 (e.g., EIDE, SATA), which internal hard disk drive 814 may also be configured for external use in a suitable chassis (not shown), a magnetic floppy disk drive (FDD) 816, (e.g., to read from or write to a removable diskette 818) and an optical disk drive 820, (e.g., reading a CD-ROM disk 822 or, to read from or write to other high capacity optical media such as the DVD). The hard disk drive 814, magnetic disk drive 816 and optical disk drive 820 can be connected to the system bus 808 by a hard disk drive interface 824, a magnetic disk drive interface 826 and an optical drive interface 828, respectively. The interface 824 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 802, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 812, including an operating system 830, one or more application programs 832, other program modules 834 and program data 836. All or portions of the operating system, applications, modules, and/or data can also be cached in the RAM 812. It is appreciated that the innovation can be implemented with various commercially available operating systems or combinations of operating systems.

A user can enter commands and information into the computer 802 through one or more wired/wireless input devices, e.g., a keyboard 838 and a pointing device, such as a mouse 840. Other input devices (not shown) may include a microphone, an IR remote control, a joystick, a game pad, a stylus pen, touch screen, or the like. These and other input devices are often connected to the processing unit 804 through an input device interface 842 that is coupled to the system bus 808, but can be connected by other interfaces, such as a parallel port, an IEEE 1394 serial port, a game port, a USB port, an IR interface, etc.

A monitor 844 or other type of display device is also connected to the system bus 808 via an interface, such as a video adapter 846. In addition to the monitor 844, a computer typically includes other peripheral output devices (not shown), such as speakers, printers, etc.

The computer 802 may operate in a networked environment using logical connections via wired and/or wireless communications to one or more remote computers, such as a remote computer(s) 848. The remote computer(s) 848 can be a workstation, a server computer, a router, a personal computer, portable computer, microprocessor-based entertainment appliance, a peer device or other common network node, and typically includes many or all of the elements described relative to the computer 802, although, for purposes of brevity, only a memory/storage device 850 is illustrated. The logical connections depicted include wired/wireless connectivity to a local area network (LAN) 852 and/or larger networks, e.g., a wide area network (WAN) 854. Such LAN and WAN networking environments are commonplace in offices and companies, and facilitate enterprise-wide computer networks, such as intranets, all of which may connect to a global communications network, e.g., the Internet.

When used in a LAN networking environment, the computer 802 is connected to the local network 852 through a wired and/or wireless communication network interface or adapter 856. The adapter 856 may facilitate wired or wireless communication to the LAN 852, which may also include a wireless access point disposed thereon for communicating with the wireless adapter 856.

When used in a WAN networking environment, the computer 802 can include a modem 858, or is connected to a communications server on the WAN 854, or has other means for establishing communications over the WAN 854, such as by way of the Internet. The modem 858, which can be internal or external and a wired or wireless device, is connected to the system bus 808 via the serial port interface 842. In a networked environment, program modules depicted relative to the computer 802, or portions thereof, can be stored in the remote memory/storage device 850. It will be appreciated that the network connections shown are exemplary and other means of establishing a communications link between the computers can be used.

The computer 802 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 9:
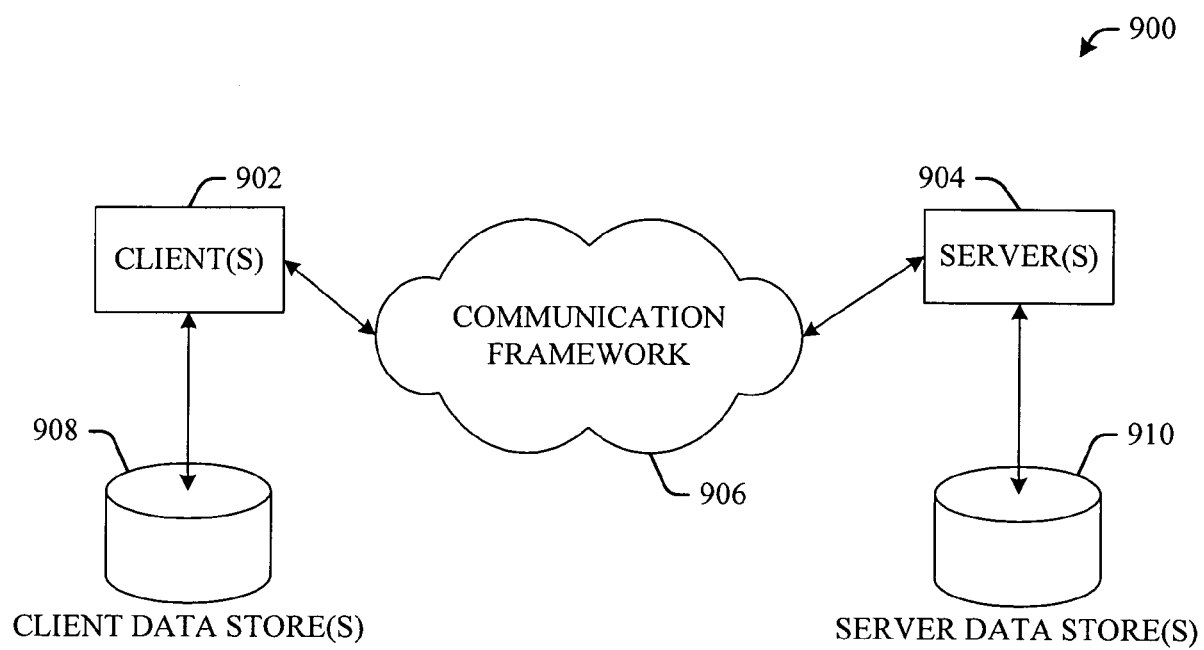
FIG. 9 illustrates a schematic block diagram of an exemplary computing environment in accordance with the subject innovation.

Referring now to FIG. 9, there is illustrated a schematic block diagram of an exemplary computing environment 900 in accordance with the subject innovation. The system 900 includes one or more client(s) 902. The client(s) 902 can be hardware and/or software (e.g., threads, processes, computing devices). The client(s) 902 can house cookie(s) and/or associated contextual information by employing the innovation, for example.

The system 900 also includes one or more server(s) 904. The server(s) 904 can also be hardware and/or software (e.g., threads, processes, computing devices). The servers 904 can house threads to perform transformations by employing the innovation, for example. One possible communication between a client 902 and a server 904 can be in the form of a data packet adapted to be transmitted between two or more computer processes. The data packet may include a cookie and/or associated contextual information, for example. The system 900 includes a communication framework 906 (e.g., a global communication network such as the Internet) that can be employed to facilitate communications between the client(s) 902 and the server(s) 904.

Communications can be facilitated via a wired (including optical fiber) and/or wireless technology. The client(s) 902 are operatively connected to one or more client data store(s) 908 that can be employed to store information local to the client(s) 902 (e.g., cookie(s) and/or associated contextual information). Similarly, the server(s) 904 are operatively connected to one or more server data store(s) 910 that can be employed to store information local to the servers 904.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates a spatial operation with respect to a polygon, comprising:
   a directionality analysis component that determines a configuration of each of a plurality of vectors that form the polygon, based at least in part, upon a slope characteristic; and
   an orientation arrangement component that reconfigures at least a subset of the plurality of vectors into a like direction based at least in part upon the slope characteristic, wherein the spatial operation employs a single formula to determine whether a point is located within a vector of each of the plurality of vectors.

2. The system of claim 1, the orientation arrangement component reconfigures a subset of the plurality of vectors having a slope into a bottom-to-top direction.

3. The system of claim 2, the spatial operation employs the single formula to determine if a point is located within a vector defined by Y-From and Y-To.

4. The system of claim 3, the single formula is Y0>Y-From and Y0<Y-To.

5. The system of claim 1, the orientation conversion component reconfigures a subset of the plurality of vectors that are horizontal into a left-to-right direction.

6. The system of claim 5, the spatial operation employs the single formula to determine if a point is located within a vector defined by X-From and X-To.

7. The system of claim 6, the single formula is X0>X-From and X0<X-To.

8. The system of claim 1, further comprising a schema generator component that creates a schema that facilitates storage of criterion that corresponds to each of the plurality of vectors.

9. The system of claim 1, the schema comprises a polygon characteristic portion and a segment characteristic portion.

10. The system of claim 9, the polygon characteristic portion comprises at least one of a polygon identifier, a ring identifier and a ring segment identifier.

11. The system of claim 9, the segment characteristic portion comprises at least one of an orientation portion, a first X-coordinate portion, a first Y-coordinate portion, a second X-coordinate portion, a second Y-coordinate portion, a slope portion and a Y-intercept portion.

12. The system of claim 9, the segment characteristic portion comprises an orientation portion, a first X-coordinate portion, a first Y-coordinate portion, a second X-coordinate portion, a second Y-coordinate portion, a slope portion and a Y-intercept portion.

13. A computer-implemented method of performing a spatial operation, comprising:
   determining a slope of a vector in a spatial representation;
   if the slope equals zero, configuring the vector in a left-to-right direction;
   if the slope is nonzero, configuring the vector in a bottom-to-top direction; and
   employing a single formula to determine if a point is displaced within the vector.

14. The computer-implemented method of claim 13, further comprising generating a schema that corresponds to characteristics of the vector and storing the characteristics of the vector in accordance with the schema.

15. The computer-implemented method of claim 14, further comprising defining a polygon characteristic portion and a segment characteristic portion within the schema.

16. The computer-implemented method of claim 15, the polygon characteristic portion comprises a polygon identifier, a ring identifier and a ring segment identifier.

17. The computer-implemented method of claim 16, the segment characteristic portion comprises an orientation portion, a first X-coordinate portion, a first Y-coordinate portion, a second X-coordinate portion, a second Y-coordinate portion, a slope portion and a Y-intercept portion.

18. A computer-executable system that facilitates a spatial operation, comprising a computer storage media having stored therein computer executable components and a processor that executes the following computer executable components:
   means for determining an orientation of a vector, based at least in part, upon a slope of the vector;
   means for configuring the vector in at least one of a bottom-to-top and a left-to-right alignment based at least in part upon the slope of the vector;
   means for storing information related to the vector; and
   means for determining if a point is positioned within a length of the vector by employing a single formula, based at least in part, upon the stored information.

19. The computer-executable system of claim 18, the means for storing information is a schema that includes a polygon characteristic portion and a segment characteristic portion.

20. The computer-executable system of claim 19, the means for determining if the point is positioned within the length of the vector is a single comparison formula.

* * * * *